(12) United States Patent
Chavan et al.

(10) Patent No.: US 11,479,704 B2
(45) Date of Patent: Oct. 25, 2022

(54) POTASSIUM SALT TREATMENT FLUIDS FOR CLAY STABILIZATION

(71) Applicant: Halliburton Energy Services, Inc., Houston, TX (US)

(72) Inventors: Sandeep Vasant Chavan, Mumbai (IN); Sunita Sameer Kadam, Pune (IN); Shreyasi Goswami, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 463 days.

(21) Appl. No.: 16/476,982

(22) PCT Filed: Aug. 10, 2018

(86) PCT No.: PCT/US2018/046209
§ 371 (c)(1),
(2) Date: Jul. 10, 2019

(87) PCT Pub. No.: WO2020/032971
PCT Pub. Date: Feb. 13, 2020

(65) Prior Publication Data
US 2021/0355365 A1 Nov. 18, 2021

(51) Int. Cl.
*C09K 8/16* (2006.01)

(52) U.S. Cl.
CPC ............ *C09K 8/16* (2013.01); *C09K 2208/12* (2013.01)

(58) Field of Classification Search
None
See application file for complete search history.

(56) References Cited

U.S. PATENT DOCUMENTS

| | | | | |
|---|---|---|---|---|
| 2,771,421 A | * | 11/1956 | Browning | C09K 8/203 530/506 |
| 3,734,188 A | | 5/1973 | Root et al. | |
| 3,737,037 A | | 6/1973 | Bone, III | |
| 3,766,229 A | | 10/1973 | Turner | |
| 4,076,628 A | * | 2/1978 | Clampitt | C09K 8/887 507/131 |
| 4,447,341 A | | 5/1984 | Block | |
| 4,547,297 A | | 10/1985 | Block | |
| 4,875,809 A | * | 10/1989 | Csajtai | C09K 8/592 166/305.1 |
| 4,988,450 A | | 1/1991 | Wingrave et al. | |
| 5,198,415 A | * | 3/1993 | Steiger | C09K 8/06 507/139 |
| 5,342,530 A | * | 8/1994 | Aften | C09K 8/035 166/275 |

(Continued)

FOREIGN PATENT DOCUMENTS

| | | |
|---|---|---|
| CN | 103131397 | 6/2013 |
| WO | 2016156559 | 10/2016 |

OTHER PUBLICATIONS

International Patent Application No. PCT/US2018/046209, International Search Report and Written Opinion dated May 3, 2019, 13 pages.

*Primary Examiner* — John J Figueroa
(74) *Attorney, Agent, or Firm* — Kilpatrick Townsend & Stockton LLP

(57) ABSTRACT

Described herein are fluids used to inhibit swelling of clay or shale formations, where the fluids include a drilling fluid and a clay stabilizer that include a potassium salt with a plurality of cations and are injectable into a wellbore.

20 Claims, 4 Drawing Sheets

(56) References Cited

U.S. PATENT DOCUMENTS

| | | | | |
|---|---|---|---|---|
| 5,389,146 A | * | 2/1995 | Liao | C04B 28/001 |
| | | | | 405/266 |
| 2009/0221453 A1 | * | 9/2009 | Mukhopadhyay | C09K 8/685 |
| | | | | 507/202 |
| 2011/0000672 A1 | | 1/2011 | Huang | |
| 2011/0071058 A1 | * | 3/2011 | Howard | C09K 8/882 |
| | | | | 507/225 |
| 2012/0227516 A1 | | 9/2012 | Weingartner | |
| 2013/0015141 A1 | | 1/2013 | Landis et al. | |
| 2017/0233643 A1 | * | 8/2017 | Agashe | C09K 8/035 |
| | | | | 507/110 |

* cited by examiner

Table: Rheology @120F for different clay stabilizer and AGS slurry

| FANN 35 @ 120F | CONTROL | | CLAYSEAL PLUS | | | | | | K-Alum | | | | | | KCl | | | | | |
|---|---|---|---|---|---|---|---|---|---|---|---|---|---|---|---|---|---|---|---|---|
| | | | 1% | | 2% | | 3% | | 1% | | 2% | | 3% | | 1% | | 2% | | 3% | |
| | BHR | AHR | BHR | AHR | BHR | AHR | BHR | AHR | BHR | AHR | BHR | AHR | BHR | AHR | BHR | AHR | BHR | AHR | BHR | AHR |
| 600 | 116 | 104 | 80 | 68 | 47 | 43 | 30 | 29 | 8 | 7 | 6 | 5 | 5 | 5 | 25 | 29 | 9 | 10 | 5 | 5 |
| 300 | 114 | 78 | 78 | 57 | 42 | 35 | 28 | 23 | 7 | 5 | 4 | 4 | 4 | 4 | 22 | 25 | 7 | 8 | 4 | 4 |
| 200 | 112 | 65 | 74 | 46 | 37 | 30 | 26 | 19 | 6 | 4 | 3 | 3 | 3 | 3 | 19 | 22 | 5 | 6 | 3 | 4 |
| 100 | 113 | 58 | 72 | 41 | 36 | 27 | 24 | 16 | 5 | 4 | 3 | 2 | 3 | 2 | 17 | 20 | 4 | 5 | 3 | 3 |
| 6 | 112 | 46 | 70 | 37 | 35 | 24 | 23 | 12 | 4 | 3 | 2 | 2 | 2 | 2 | 15 | 19 | 3 | 4 | 2 | 3 |
| 3 | 110 | 45 | 70 | 36 | 35 | 23 | 23 | 12 | 3 | 3 | 2 | 1 | 2 | 1 | 14 | 18 | 2 | 4 | 1 | 2 |
| PV | 2 | 26 | 2 | 11 | 5 | 8 | 2 | 6 | 1 | 2 | 2 | 1 | 1 | 1 | 3 | 4 | 2 | 2 | 1 | 1 |
| YP | 112 | 52 | 78 | 46 | 37 | 27 | 26 | 17 | 6 | 3 | 2 | 3 | 3 | 3 | 19 | 21 | 5 | 6 | 3 | 3 |
| pH | | 8.57 | | 8.46 | | 8.78 | | 8.89 | | 8.73 | | 8.58 | | 8.26 | | 8.32 | | 8.18 | | 8.12 |

FIG. 2

Table: CST analysis of K-Alum and KCl on London Clay

| Sr.No | Shale Inhibitor | Concentration (%) | Avg. Time (secs) | Time-1 (secs) | Time-2 (secs) |
|---|---|---|---|---|---|
| 1 | Water | 100.00 | 435 | 440 | 430 |
| 2 | KCl | 0.50 | 229 | 232 | 225 |
| 3 | KCl | 1.00 | 192 | 196 | 188 |
| 4 | KCl | 5.00 | 115 | 113 | 117 |
| 5 | K-Alum | 0.25 | 132 | 126 | 137 |
| 6 | K-Alum | 0.50 | 106 | 105 | 107 |
| 7 | K-Alum | 0.75 | 104 | 106 | 102 |
| 8 | K-Alum | 1.00 | 98 | 97 | 99 |

FIG.3

POTASSIUM SALT TREATMENT FLUIDS FOR CLAY STABILIZATION

FIELD

The present disclosure relates to treatment fluids and methods for using treatment fluids in a wellbore. The present disclosure relates more particularly to clay stabilizers that include a potassium salt that include a plurality of cations that can be used in wellbore operations.

BACKGROUND

Plugging of a wellbore may slow or cease production from a well. Clay stabilizers are chemical additives used in treatment fluids of wellbore operations, often used in stimulation treatments that maintain, restore, or enhance the productivity of a well. During drilling operations, a water-based drilling fluid is often used. The clay in the wellbore can absorb water from the drilling fluid and swell in reaction to contact with the water-based fluid. The electrical charge of naturally occurring clay platelets in a subterranean formation can be affected. Modifying the charge can cause the platelets to disperse and migrate into the flowing drilling fluid. Once platelets are dispersed, some clay plugging of the formation can occur. Clay stabilizers can prevent the migration or swelling of clay particles by altering the electrical charge of the clay platelets and minimize or prevent the clay from swelling or migrating into the flowing drilling fluid, which can plug the wellbore. Clay stabilizers act to retain the clay platelets in position by controlling the charge and electrolytic characteristics of the treatment fluid. By retaining and stabilizing the clay platelets, plugging of the wellbore can be reduced or eliminated, allowing the productivity of the well to be maintained or enhanced.

Potassium chloride (KCl) is a conventional clay stabilizer used in treatment fluids of wellbore operations. Potassium chloride (KCl) is a single-cation soluble salt that is an efficient shale stabilizer when drilling hydro sensitive clays and shales. The potassium ion (K+), specifically its charge and size, helps provide stability to the clay in the formation. However, potassium chloride is in high demand and alternative sources of potassium ion for clay stabilizers are desired.

BRIEF DESCRIPTION OF THE DRAWINGS

FIG. 2 is a table showing rheological properties of treatment fluids with a clay stabilizer according to one example of the present disclosure.

FIG. 3 is a table showing capillary suction time (CST) results of treatment fluids with a clay stabilizer according to one example of the present disclosure.

DETAILED DESCRIPTION

Figure 1:
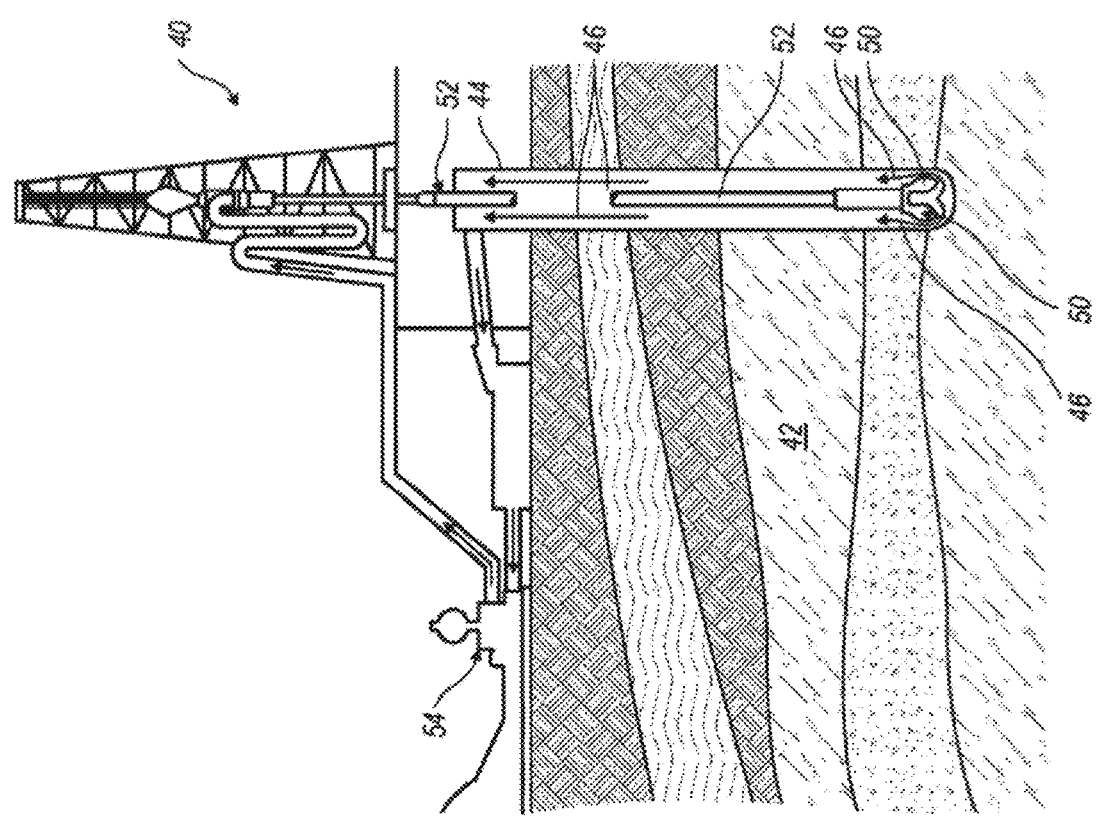
FIG. 1 is an illustrative schematic of a drilling assembly using a drilling fluid according to one or more embodiments described herein.

Certain aspects and features of the present disclosure relate to treatment fluids with clay stabilizers that are injectable into a wellbore. In some examples, the treatment fluids can include a drilling fluid and a clay stabilizer having a potassium salt comprising a plurality of cations. In some examples, the potassium salt can be a double salt.

Clay stabilizers are chemical additives used in treatment fluids of wellbore operations, often used in stimulation treatments that maintain, restore, or enhance the productivity of a well. During drilling operations, clay in the wellbore can absorb water from the drilling fluid and swell in reaction to contact with the water-based fluid, affecting the electrical charge of naturally occurring clay platelets in a subterranean formation. Clay stabilizers can inhibit the migration or swelling of clay particles by altering the electrical charge of the clay platelets and minimize or prevent the clay from swelling or migrating into the flowing drilling fluid.

In some examples, a clay stabilizer can have a potassium salt that includes a plurality of cations. For example, the potassium salt may include a potassium cation and a magnesium cation or a potassium cation and an aluminum cation. In some cases, the clay stabilizer may be a double salt that includes potassium. In some cases, the clay stabilizer may be a triple salt that includes potassium.

Inhibition can be achieved through ion exchange with a potassium-containing clay stabilizer where the potassium ion enters the clay formation between the individual clay platelets in the shale so that they are held together, thus restricting the entry of water from the drilling fluid. The charge and size of the potassium ion can help retain the clay platelets in position and prevent swelling and migration of clay platelets in the formation. The ionic radius of a potassium ion, which is about 2.66 Å, is similar in size to the spacing between layers in swelling clays such as smectite, which is about 2.8 Å. This similarity allows the potassium ion to fit snugly between unit layers, forming a bond that can inhibit swelling of the clay in the presence of water. Small ions like potassium fits between clay layers more easily and are permanently exchanged. A potassium ion also has low hydration diameter (7.6 Å) as compared to other monovalent and divalent cations such as Li, Na, Ca, Mg, Al etc. A low hydration diameter is desirable to help reduce clay swelling.

In some examples, the clay stabilizer can include potash alum, carnillite, langbeinite, polyhalite, potassium metabisulfite, potassium selenite, potassium tungstate, sodium potassium tartrate, kainite, potassium schoenite, bittern, or the hydrates thereof. In certain examples, the potassium salt comprising a plurality of cations can be present a treatment fluid in an amount ranging from about 0.1 wt. % to about 5.0 wt. %. For example, the treatment fluid can include a potassium salt comprising a plurality of cations in amount from about 0.5 to about 5 wt. %, about 0.1 to about 1 wt. %, about 1 wt. % to about 3 wt. %, or about 2 wt. % to about 4 wt. %.

In one or more examples, the treatment fluid also includes a drilling fluid. The drilling fluid may include water, a brine, or a hydrocarbon fluid. The water may be fresh water, seawater, or salt water, for example. The hydrocarbon fluid may be mineral oils, biodegradable esters, olefins, or other variants.

Turning to the figures, FIG. 1 illustrates a wellbore 44 being drilled through a subterranean formation 42. A drill rig 40 can be used for drilling the wellbore 44. A drill bit 50 may be mounted on the end of a drill string 52 that includes multiple sections of drill pipe. The wellbore 44 may be drilled by using a rotary drive at the surface to rotate the drill string 52 and to apply torque and force to cause the drill bit 50 to extend through wellbore 44. A drilling fluid may be displaced through the drill string 52 using one or more pumps 54. The drilling fluid may be circulated past the drill bit 50 and returned to the surface through the annulus of wellbore 44, as indicated by arrows 46, thereby removing drill cuttings (e.g., material such as rock generated by the drilling) from the wellbore 44. A treatment fluid including a clay stabilizer can be added to the drilling fluid. Although not shown, additional conduits besides drill string 52 may also be disposed within wellbore 44.

Various methods are available to evaluate a wellbore and properties of fluids used in well production. Capillary-suction-time (CST) tests can be used to compare the effects of aqueous fluids on the tendency for clay swelling or dispersion and evaluate the effectiveness of treatment fluids with clay stabilizers. CST tests are a static filtration test that measure filtration rate as determined by the time for water to pass a standard distance between two electrodes, with filter paper as the medium. CST can indicate filter-cake permeability, behavior of clays and shales in filter cakes, and the effect of brine composition on clays in a filter cake. CST can be used as a direct indication that clay platelets have absorbed water and migrating within a clay sample. CST can also be used as a direct indication that the clay has stopped swelling and stabilized after stimulation treatment with the clay stabilize. The lower the CST result, the faster water can pass between the test electrodes, indicating the path between the electrodes is not obstructed or plugged with clay. Similarly, a decrease in CST value of a clay sample post-stimulation treatment can indicate that the clay stabilizer have altered the charge and stability of the clay. Thus, a low CST result is desirable as in indication that a wellbore is not plugged or have restricted flow.

In some examples, a treatment fluid with a clay stabilizer having a potassium salt comprising a plurality of cations has a CST result at least 20% lower than a treatment fluid with a comparison clay stabilizer, where the concentration of clay stabilizer is substantially the same in each fluid. One example of a comparison clay stabilizer utilizes potassium chloride rather than a potassium salt comprising a plurality of cations as described herein. In some cases, a treatment fluid with clay stabilizers having a potassium salt comprising a plurality of cations can have a CST result over 50% lower than a treatment fluid with a comparison clay stabilizer. In some examples, CST results comparable to comparison clay stabilizers can be achieved with much lower concentrations of clay stabilizers having a potassium salt comprising a plurality of cations. Reduced concentrations of clay stabilizers may be advantageous to lower material consumption, lower operating costs, maintain fluid properties, and limit potential environmental impacts of drilling the wellbore as compared to conventional clay stabilizers that include a comparison clay stabilizer.

Rheological tests can be used as an indirect method to evaluate the effectiveness of a treatment fluid to stabilize a subterranean formation and the degree of swelling in a clay sample treated with a treatment fluid. A viscometer can be used to measure rheological properties of a treatment fluid, including Bingham plastic model properties of yield point (VP) and plastic viscosity (PV). In some cases, a direct-indicating viscometer can be used.

VP can be used to evaluate the ability of a drilling fluid to lift cuttings out of the wellbore during drilling. A high YP implies a non-Newtonian fluid, one that carries drill cuttings to the surface better than a fluid of similar density but lower YP. However, with well production, a low VP can indicate that the clay platelets in the formation are not migrating to the drilling fluid. Clay platelets in the drilling fluid would increase the viscosity of the fluid, and potentially plug the well. VP can be determined from a plot of shear stress and shear rate by extrapolating the yield stress of a fluid to a shear rate of zero or using a direct viscometer according to Eq. 1:

$$\text{Yield Point (VP)} = \text{Viscometer Reading at 300 rpm} - \text{Plastic Viscosity} \quad [\text{Eq. 1}]$$

where the unit of YP is lb/100 ft$^2$ and Plastic Viscosity (PV) is determined from the slope of the shear stress/shear rate line above the yield point or using a direct measure viscometer according to Eq. 2:

$$\text{Plastic Viscosity (PV)} = \text{Reading at 600 rpm} - \text{Reading at 300 rpm} \quad [\text{Eq. 2}]$$

PV is a measure of the viscosity of a drilling fluid when extrapolated to infinite shear rate. A low PV indicates that a drilling fluid is capable of drilling rapidly because of the low viscosity of drilling fluid. A high PV can be caused by a viscous base fluid and can indicate that clay platelets in the formation are migrating to the drilling fluid, increasing the viscosity of the fluid, and potentially plugging the well. A low yield point plastic viscosity (PV) and yield point (VP) result is desirable for treatment fluids with clay stabilizers, which can indicate that the clay platelets are not migrating into the drilling fluid and plugging the wellbore.

In some examples, treatment fluids with a clay stabilizer having a potassium salt comprising a plurality of cations has a VP result lower than a treatment fluid with a comparison clay stabilizer, where the concentration of clay stabilizers in each treatment fluid is substantially the same. Treatment fluids with clay stabilizers having a potassium salt comprising a plurality of cations can have a VP result over 60% lower than treatment fluids with a comparison clay stabilizer. In some examples, VP results comparable to a comparison clay stabilizer can be achieved with much lower concentrations of clay stabilizers having a potassium salt comprising a plurality of cations.

In some examples, a treatment fluid with a clay stabilizer having a potassium salt comprising a plurality of cations has a PV result lower than a treatment fluid with a comparison clay stabilizer, where the concentration of clay stabilizers is substantially the same. A treatment fluid with a clay stabilizer having a potassium salt comprising a plurality of cations can have a PV result over 60% lower than a treatment fluid with a comparison clay stabilizer. In some examples, PV results comparable to a comparison clay stabilizer can be achieved with much lower concentrations of clay stabilizers having a potassium salt comprising a plurality of cations.

In some cases, lower in PV and VP results for potassium salt comprising a plurality of cations as compared to a comparison clay stabilizer can be present both before heat treatment and after heat treatment of the treatment fluid. The treatment fluid can be heated to simulate the conditions of a wellbore, where the treatment fluid can significantly increase in temperature. A sample may be heated in a rolling or tumbling apparatus to ensure the fluid remains mobile during the heating period. In certain examples, the treatment fluid may be heated to 100° F. to 400° F. The treatment fluid may be maintained at temperature for a time period of 1 hour to 20 hours. For example, a treatment fluid may be heated 150° F. and held at temperature for sixteen hours.

Commercial shale stabilizers, such as amine-based shale stabilizers, can be used to inhibit hydration of reactive clays and shale formations. In some examples, a treatment fluid with a clay stabilizer having a potassium salt comprising a plurality of cations has a YP result over 90% lower than a treatment fluids with a shale stabilizer that includes ethoxylated polyamine, where the concentration of the clay stabilizers is substantially the same. A treatment fluid with clay stabilizers having a potassium salt comprising a plurality of cations can have a YP result over 90% lower than a treatment fluid with a shale stabilizer that includes ethoxylated polyamine.

The effectiveness of clay stabilizers having a potassium salt comprising a plurality of cations provide opportunities for reduced consumption of clay stabilizers and potential reduction in raw material costs to achieve similar results to conventional potassium chloride stabilizers or commercial shale stabilizers.

In some examples, a potassium salt comprising a plurality of cations may be contacted with a drilling fluid to produce a treatment fluid. A wellbore in a shale or clay formation can be treated with the treatment fluid to stimulate production in the wellbore. In certain example, the potassium salt comprising a plurality of cations and the drilling fluid may be mixed or combined to be substantially homogenous.

In some cases, a wellbore in a shale or clay formation can be treated with the treatment fluid where the potassium salt comprising a plurality of cations clay stabilizer can include potash alum, carnillite, langbeinite, polyhalite, potassium metabisulfite, potassium selenite, potassium tungstate, sodium potassium tartrate, kainite, potassium schoenite, bittern, or hydrates thereof. In certain examples, the wellbore can be treated with a treatment fluid having a potassium salt comprising a plurality of cations present in an amount within a range of about 0.1 wt. % to about 5.0 wt. %. For example, the treatment fluid can include a potassium salt comprising a plurality of cations in an amount from about 0.5 to about 5 wt. %, about 0.1 to about 1 wt. %, about 1 wt. % to about 3 wt. %, or about 2 wt. % to about 4 wt. %. In some cases, a wellbore in a shale or clay formation can be treated with the treatment fluid where the drilling fluid includes water, brine, or a hydrocarbon fluid.

Treating a wellbore with a treatment fluid that includes a drilling fluid and a clay stabilizer may include introducing the treatment fluid into a wellbore. In some cases, the treatment fluid may be injected into the wellbore. Treating a wellbore with a treatment fluid can include a step of circulating the treatment fluid in a wellbore. The treatment fluid can be circulated to allow the clay stabilizers having a potassium salt comprising a plurality of cations to contact the clay within the wellbore and modify a charge of the clay platelets to reduce or eliminate swelling or migration of the platelets. In some cases, a sample of the treatment fluid can be taken while circulating within a wellbore. The sample can be tested for rheological properties of the treatment fluid to evaluate the amount of plugging within the wellbore. For example, a CST test, a shale erosion test, or a linear swell test can be performed on a treatment fluid at various points during treatment. The effectiveness of the treatment can be determined by changes in the properties of the treatment fluid as it is contacted with the clay of the wellbore. In some cases, testing can include determining of plastic viscosity or yield point. In certain cases, the treatment fluid may be circulated until a threshold value for CST, plastic viscosity, or yield point is reached. In other cases, the treatment fluid may be circulated until a targeted level of reduction in the CST, plastic viscosity, or yield point value is reached.

Figure 4:
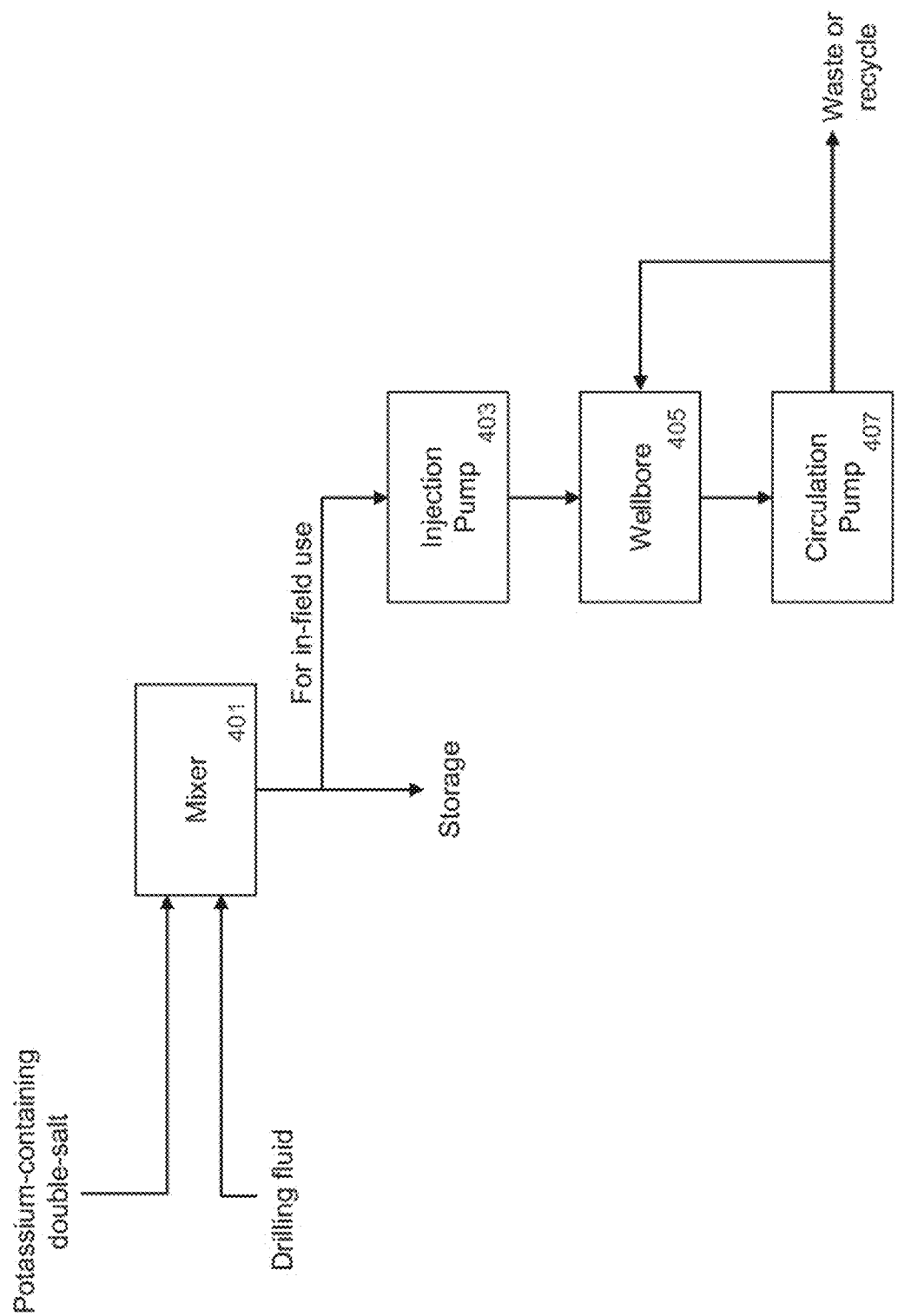
FIG. 4 is a block diagram showing treatment fluids with a clay stabilizer used in wellbores according to one example of the present disclosure.

In some cases, systems to treat a wellbore with a treatment fluid may be configured. As shown in FIG. 4, a system may include a mixer 401 that contacts a clay stabilizer having a potassium salt comprising a plurality of cations and a drilling fluid to form a treatment fluid and an injection pump 403 to inject the treatment fluid into a wellbore. A system for treating a wellbore with a treatment fluid can include a circulation pump 407 to circulate a treatment fluid within a wellbore. In some cases, the system may also include a sample port (not shown) to pull samples of the treatment fluid as it is circulated within a wellbore 405. In some examples, the treatment fluid may be packaged into barrels or other containers and placed in storage for future use. Once the wellbore stimulation treatment is complete, the treatment fluid may be send for waste or recycle.

EXAMPLES

Example 1

Rheology Testing

Various clay stabilizers, or shale inhibitors, were combined with fresh water to prepare treatment fluids for rheological testing. The treatment fluids were prepared using a barrel of fresh water and adding a known amount of clay stabilizer to the barrel. Treatment fluids were prepared with 1 wt. %, 2 wt. %, and 3 wt. % of clay stabilizer. Clay stabilizers tested included a shale stabilizer that includes ethoxylated polyamine, potash alum ("K-Alum"), and potassium chloride ("KCl"). Once the clay stabilizer was dissolved in the water, the pH of the solution was adjusted to about nine using caustic. 30 g of a bentonite viscosifier was then added to each treatment fluid. Each barrel was mixed for twenty minutes. A FANN® viscometer was used to measure the rheology of each treatment fluid. Each treatment fluid was hot rolled at 150° F. for sixteen hours. The rheology tests before the sample was hot rolled ("BHR") and after the sample was hot rolled ("AHR") were conducted at 120° F. The control was AGS and water, without any stabilizer. The results are tabulated in FIG. 2.

The treatment fluid with 1% KCl had a YP of 19 lb/100 ft$^2$, whereas as a treatment fluid with 1% K-Alum had a VP of 6 lb/100 ft$^2$, as determined by a FANN® viscometer at 120° F. prior to heat treatment. After heat treatment, the KCl sample experienced a slight increase in VP while the K-Alum sample experienced a decrease. The VP of K-Alum sample remained significantly lower than VP of the KCl sample. The treatment fluid with 3% KCl had a YP of 3 lb/100 ft$^2$, whereas as a treatment fluid with 1% K-Alum had a YP of 2 lb/100 ft$^2$, prior to heat treatment. The YP of the K-Alum sample was lower than the KCl both before and after heat treatment of the treatment fluid.

The treatment fluid with 1% KCl had a PV of 3 cp, whereas as a treatment fluid with 1% K-Alum had a PV of 1 cp, as determined by a FANN® viscometer at 120° F., prior to heat treatment. The PV of the K-Alum sample was lower than the KCl both before and after heat treatment of the treatment fluid. The treatment fluid with 3% KCl had a PV of 1 cp, whereas as a treatment fluid with 1% K-Alum had a PV of 1 cp, prior to heat treatment.

The treatment fluid with 1% a shale stabilizer that includes ethoxylated polyamine had a VP of 76 cp, whereas as a treatment fluid with 1% K-Alum had a PV of 1 cp, as determined by a FANN® viscometer at 120° F., prior to heat treatment. The lower YP of the K-Alum sample was present both before and after heat treatment of the treatment fluid.

The K-Alum sample showed the least amount of clay swelling as compared to other clay stabilizers or the control according to the rheological tests. It was also observed that K-Alum was effective even at low concentration of 1 to 2%, indicating that a potential benefit of reduced consumption was possible. The results for 3% K-Alum and 3% KCl were found to be similar. When compared to the shale stabilizer that includes ethoxylated polyamine, both salt based systems, KCl and K-Alum, showed better performance.

Example 2

Capillary Suction Time (CST)

The inhibition of the K-Alum salt and KCl salt was also evaluated by CST analysis on London Clay as a representative shale. The CST served as a proxy to determine the shale inhibition of London Clay. Different concentrations of both K-Alum and KCl were prepared and tested for CST by determining the time to pass across a fixed radial distance (i.e., a one-inch gap) between electrodes arranged in a triangular manner.

A CST meter, three sensor plates with electrodes and trays, stainless steel funnels, and test blotter paper, such as chromatography filter paper, were prepared for CST testing. The test blotter paper was placed on the top of the sensor trays, and the sensor plates were placed with the electrode side down on top of the test blotter paper. The stainless steel funnel was then placed into the gap between the sensor plates. Approximately 2.0 g of a clay (shale) sample and 24 mL of a salt solution were placed in a blender and mixed. Approximately 4 mL of the mixture was injected into the stainless steel funnel. The CST meter determined the time for the fluid to cross between the electrodes, the time for the fluid to contact the third electrode after contacting the first two electrodes. The test was repeated and the average of three test results was then recorded. The CST results are summarized in FIG. 3.

The treatment fluid with 1% KCl had an average CST result of 192 seconds, whereas as the treatment fluid with 1% K-Alum had an average CST result of 98 seconds. For example, a treatment fluid with 5% KCl had an average CST result of 115 seconds, whereas as a treatment fluid with 0.5% K-Alum had an average CST result of 106 seconds.

Even low concentrations of K-Alum were observed to have better CAT performance than KCl. As a base case, the control, London Clay with water, was found to have an average time of about 435 seconds. For KCl, low concentrations such as 0.5%-1% were found to give only minor effect on clay stabilization. The KCl average CST time was lower than the control at about 190-230 seconds. Increasing the concentration of the KCl to as high as 5% was necessary to achieve a CST result of about 110-120 seconds, and be comparable to the performance of K-Alum.

K-Alum even low concentrations was found to have low CST results, indicating high shale stabilization, i.e., low migration of platelets. A concentration as low as 0.25% K-Alum resulted in average CST of 130-140 seconds. On further increasing the K-Alum concentration to 0.5 to 0.75% resulted in lower CST. The 1% K-Alum sample resulted in best performance with an average CST of about 98-100 seconds, indicating that the fluid could easily flow between the test electrodes. Illustrative embodiments of suitable fluids and methods.

As used below, any reference to methods, products, or systems is understood as a reference to each of those methods, products or systems disjunctively (e.g., "Illustrative embodiment 1-4 is understood as illustrative embodiment 1, 2, 3, or 4.").

Illustrative embodiment 1 is a fluid comprising a drilling fluid and a clay stabilizer comprising a potassium salt comprising a plurality of cations, the fluid being injectable into a wellbore.

Illustrative embodiment 2 is the fluid of any preceding or subsequent illustrative embodiment, wherein the potassium salt is a double salt.

Illustrative embodiment 3 is the fluid of any preceding or subsequent illustrative embodiment, wherein the clay stabilizer comprises potash alum, camillite, langbeinite, polyhalite, potassium metabisulfite, potassium selenite, potassium tungstate, sodium potassium tartrate, kainite, potassium schoenite, bittern, or hydrates thereof.

Illustrative embodiment 4 is the fluid of any preceding or subsequent illustrative embodiment, wherein the potassium salt comprises more than one potassium cation.

Illustrative embodiment 5 is the fluid of any preceding or subsequent illustrative embodiment, wherein the potassium salt comprises an aluminum cation.

Illustrative embodiment 6 is the fluid of any preceding or subsequent illustrative embodiment, wherein the potassium salt comprises a magnesium cation.

Illustrative embodiment 7 is the fluid of any preceding or subsequent illustrative embodiment, wherein the drilling fluid comprises water, brine, or a hydrocarbon fluid.

Illustrative embodiment 8 is the fluid of any preceding or subsequent illustrative embodiment, wherein the fluid has a capillary suction time (CST) lower than a CST of a fluid comprising a comparison clay stabilizer, wherein a concentration of the clay stabilizers in each fluid is substantially the same.

Illustrative embodiment 9 is the fluid of any preceding or subsequent illustrative embodiment, wherein the CST is at least 20% lower than the CST of the fluid comprising the comparison clay stabilizer.

Illustrative embodiment 10 is the fluid of any preceding or subsequent illustrative embodiment, wherein the CST is over 50% lower than the CST of the fluid comprising the comparison clay stabilizer.

Illustrative embodiment 11 is the fluid of any preceding or subsequent illustrative embodiment, wherein the fluid is positionable in the wellbore to reduce swelling of clay particles in reaction to a water-based fluid in the wellbore.

Illustrative embodiment 12 is the fluid of any preceding or subsequent illustrative embodiment, wherein the potassium salt is present in an amount within a range of about 0.1 wt. % to about 5.0 wt. %.

Illustrative embodiment 13 is the fluid of any preceding or subsequent illustrative embodiment, wherein the fluid has a plastic viscosity (PV) lower than a PV of a fluid comprising the comparison clay stabilizer, wherein a concentration of the clay stabilizers in each fluid is substantially the same.

Illustrative embodiment 14 is the fluid of any preceding or subsequent illustrative embodiment, wherein the PV is over 60% lower than the PV of the fluid comprising the comparison clay stabilizer.

Illustrative embodiment 15 is the fluid of any preceding or subsequent illustrative embodiment, wherein the fluid has a yield point (YP) lower than a YP of a of the fluid comprising the comparison clay stabilizer, wherein a concentration of the clay stabilizers in each fluid is substantially the same.

Illustrative embodiment 16 is the fluid of any preceding or subsequent illustrative embodiment, wherein the VP is over 60% lower than the YP of the fluid comprising the comparison clay stabilizer.

Illustrative embodiment 17 is a method comprising contacting a drilling fluid with a potassium salt comprising a plurality of cations to form a treatment fluid; and contacting a wellbore in a clay or shale formation with the treatment fluid.

Illustrative embodiment 18 is the method of any preceding or subsequent illustrative embodiment, wherein the potassium salt is a double salt.

Illustrative embodiment 19 is the method of any preceding or subsequent illustrative embodiment, wherein the potassium salt comprises potash alum, camillite, langbeinite, polyhalite, potassium metabisulfite, potassium selenite, potassium tungstate, sodium potassium tartrate, kainite, potassium schoenite, bittern, or hydrates thereof.

Illustrative embodiment 20 is the method of any preceding or subsequent illustrative embodiment, wherein the drilling fluid comprises water, brine, or a hydrocarbon fluid.

Illustrative embodiment 21 is the method of any preceding or subsequent illustrative embodiment, further comprising introducing the treatment fluid into a wellbore.

Illustrative embodiment 22 is the method of any preceding or subsequent illustrative embodiment, further comprising circulating the treatment fluid in the wellbore.

Illustrative embodiment 23 is the method of any preceding or subsequent illustrative embodiment, further comprising determining a capillary-suction-time (CST) of the treatment fluid once the treatment fluid has contacted the wellbore.

Illustrative embodiment 24 is the method of any preceding or subsequent illustrative embodiment, wherein the potassium salt is present in the treatment fluid in an amount within a range of about 0.1 wt. % to about 5.0 wt. %.

Illustrative embodiment 25 is the method of any preceding or subsequent illustrative embodiment, further comprising determining at least one of a capillary-suction-time (CST), plastic viscosity, or yield point of a the fluid once the fluid has contacted the wellbore.

Definitions and Descriptions

The terms "disclosure," "the disclosure," "the present disclosure," "embodiment," "certain embodiment" and the like are used herein are intended to refer broadly to all the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted. It is further noted that, as used in this specification, the singular forms "a," "an," and "the" include plural referents unless expressly and unequivocally limited to one referent.

Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

Various embodiments of the present disclosure have been described herein. It should be recognized that these embodiments are merely illustrative of the present disclosure. Variations of those preferred embodiments may become apparent to those of ordinary skill in the art upon reading the foregoing description. The inventors expect skilled artisans to employ such variations as appropriate, and the inventors intend for the present disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated or otherwise clearly contradicted by context.

It is to be understood that the present description illustrates aspects of the disclosure relevant to a clear understanding of the present disclosure. Certain aspects of the disclosure that would be apparent to those of ordinary skill in the art and that, therefore, would not facilitate a better understanding of the disclosure have not been presented in order to simplify the present description. Although the present disclosure has been described in connection with certain embodiments, the present disclosure is not limited to the particular embodiments disclosed, but is intended to cover modifications that are within the spirit and scope of the disclosure.

What is claimed is:

1. A fluid comprising:
 a drilling fluid; and
 a clay stabilizer comprising a potassium salt comprising a plurality of cations, wherein the potassium salt comprises one or more of potash alum, carnillite, langbeinite, polyhalite, potassium metabisulfite, potassium selenite, potassium tungstate, kainite, potassium schoenite, bittern, or hydrates thereof, and wherein
 the fluid is injectable into a wellbore.

2. The fluid of claim 1, wherein the potassium salt is a double salt.

3. The fluid of claim 1, wherein the potassium salt comprises more than one potassium cation.

4. The fluid of claim 1, wherein the potassium salt comprises a potassium cation and an aluminum cation.

5. The fluid of claim 1, wherein the potassium salt comprises a potassium cation and a magnesium cation.

6. The fluid of claim 1, wherein the drilling fluid comprises water, brine, or a hydrocarbon fluid.

7. The fluid of claim 1, wherein the fluid has a capillary suction time (CST) lower than a CST of a fluid comprising a comparison clay stabilizer, wherein a concentration of the clay stabilizers in each fluid is substantially the same.

8. The fluid of claim 7, wherein the CST is at least 20% lower than the CST of the fluid comprising the comparison clay stabilizer.

9. The fluid of claim 7, wherein the CST is over 50% lower than the CST of the fluid comprising the comparison clay stabilizer.

10. The fluid of claim 1, wherein the fluid is positionable in the wellbore to reduce swelling of clay particles in reaction to a water-based fluid in the wellbore.

11. The fluid of claim 1, wherein the potassium salt is present in an amount within a range of about 0.1 wt. % to about 5.0 wt. %.

12. The fluid of claim 1, wherein the clay stabilizer further comprises sodium potassium tartrate.

13. The fluid of claim 1, wherein the potassium salt comprises a potassium cation, a magnesium cation, and a calcium cation.

14. A method comprising:
   contacting a drilling fluid with a potassium salt comprising a plurality of cations to form a treatment fluid, wherein the potassium salt comprises one or more of potash alum, carnillite, langbeinite, polyhalite, potassium metabisulfite, potassium selenite, potassium tungstate, kainite, potassium schoenite, bittern, or hydrates thereof; and
   injecting the treatment fluid into a wellbore to contact a clay or shale formation with the treatment fluid.

15. The method of claim 14, wherein the potassium salt is a double salt.

16. The method of claim 14, wherein the drilling fluid comprises water, brine, or a hydrocarbon fluid.

17. The method of claim 14, further comprising introducing the treatment fluid into a wellbore.

18. The method of claim 17, further comprising circulating the treatment fluid in the wellbore.

19. The method of claim 14, further comprising determining a capillary-suction-time (CST) of the treatment fluid once the treatment fluid has contacted the wellbore.

20. The method of claim 14, wherein the potassium salt is present in the treatment fluid in an amount within a range of about 0.1 wt. % to about 5.0 wt. %.

* * * * *